United States Patent [19]

Hsu et al.

[11] Patent Number: 4,871,042
[45] Date of Patent: Oct. 3, 1989

[54] ELECTRIC BICYCLE

[76] Inventors: Chi-chu Hsu, 4F. No. 144, Chu Lin Rd., Yung Ho, Taipei; Chin-ching Yu, 31, Lane 4, Tunhua Rd., Taipei; Suyueh Chao, 2-1, Lane 162, Szu Wei Rd., Taipei; Miguel C. J. Huang, 183, Neihu Rd., Sect. 2, Taipei, all of Taiwan

[21] Appl. No.: 239,429

[22] Filed: Sep. 1, 1988

[51] Int. Cl.$^4$ .............................................. B62K 11/00
[52] U.S. Cl. ..................................... 180/220; 180/65.2
[58] Field of Search .................... 180/65.2, 65.3, 65.6, 180/220, 205, 207

[56] References Cited

U.S. PATENT DOCUMENTS

| | | | |
|---|---|---|---|
| 1,485,682 | 3/1924 | Liese | 280/281.1 |
| 2,457,430 | 12/1948 | Argyris | 180/207 |
| 2,725,759 | 12/1955 | Kreidler | 180/207 |
| 4,030,562 | 6/1977 | Leighton et al. | 180/220 |

Primary Examiner—Charles A. Marmor
Assistant Examiner—Donn McGiehan
Attorney, Agent, or Firm—Morton J. Rosenberg; David I. Klein

[57] ABSTRACT

An electric bicycle which includes an electric power driving mechanism in combination with a manual pedal driving system. The electric bicycle may be actuated by manual pedalling of the user, or through electrical power actuation or a combination of electrical power and manual operation. The power driving system includes a motor coupled to reduction gears for driving a set of bevel gears. The bevel gears are coupled to a shaft member having secured thereto a transmission gear to engage with a sprocket wheel to displace a standard chain member. The motor is supplied with DC electricity by a battery which may either be charged by solar cells or alternating current passing through a rectifier supplied by an external power system. Still further, the electric bicycle may have its speed controlled with a user's hand actuated speed controller mechanism.

2 Claims, 6 Drawing Sheets

ELECTRIC BICYCLE

BACKGROUND OF THE INVENTION

Air pollution has become an increasing problem due to the increase of the use of automobiles and motorcycles. The air pollution problem is epitomized in cities where gasoline being used as a fuel for automobiles and motorcycles has added to pollution fumes input to the environment. In order to improve the air quality in cities or towns, it is advantageous to use manually powered bicycles or electric bicycles as a transportation mechanism. The subject invention is directed to an electric bicycle which may either be driven by electrical power or manually operated by the user. Through use of the electric bicycle of the instant invention concept, air quality may be improved.

SUMMARY OF THE INVENTION

An electric bicycle is provided which includes a sprocket wheel defining an inner ring and an outer ring with the inner ring having a plurality of tooth members extending therefrom. A power drive mechanism for electrically actuating the electric bicycle is included with the power drive mechanism including a motor rotatively coupled to a set of reduction gear members. The reduction gear members are coupled to a main bevel gear with the main bevel gear matingly engaging a direction changing bevel gear and a first balance bevel gear on opposing sides thereof. The direction changing bevel gear matingly engages the main bevel gear and a second balance bevel gear on opposing sides thereof. A clutch is mounted on a shaft member passing centrally through the direction changing bevel gears and a first balance bevel gear. The clutch includes a plurality of ball bearings rotatively mounted in an outer raceway of the clutch. A transmission gear is fixedly secured to the shaft member for engaging the tooth members of the sprocket wheel inner ring. A mechanism for electrically powering the electric bicycle is provided with the electrical power mechanism including a battery and a solar cell. The solar cell and the battery are electrically coupled to each other. A speed control mechanism is further provided which includes a rotatably actuated variable resistor electrically coupled to the electricl power mechanism of the electric bicycle. The rotatably actuated variable resistor is secured within a speed changing handle and the variable resistor is actuated by rotation of the speed changing handle for varying electrical current to the motor whereby rotational speed of the motor may be varied.

Thus, the electric bicycle as herein described includes a power driving system in combination with a pedal driving system in order to enable the bicycle to be driven either manually or through electrical power, or in combination. The pedal driving system is similar to prior art manually actuated bicycles and inclues a sprocket wheel, a chain, a clutch, and crank arms with pedals. The electrical power driving mechanism includes a motor, a battery, a solar cell and a rectifier for alternating current input. A set of reduction gears is provided in combination with a plurality of bevel gears and a clutch in order to transmit the rotation of the motor through the reduction gears to a transmission gear engaging the sprocket wheel in order that the motor may drive the sprocket wheel to displace the chain and result in displacement of the bicycle.

The battery included within this system supplies direct current electricity to the motor and may be charged by the solar cells or by an external AC power source.

DETAILED DESCRIPTION OF THE PREFERRED EMBODIMENTS

Figure 1:
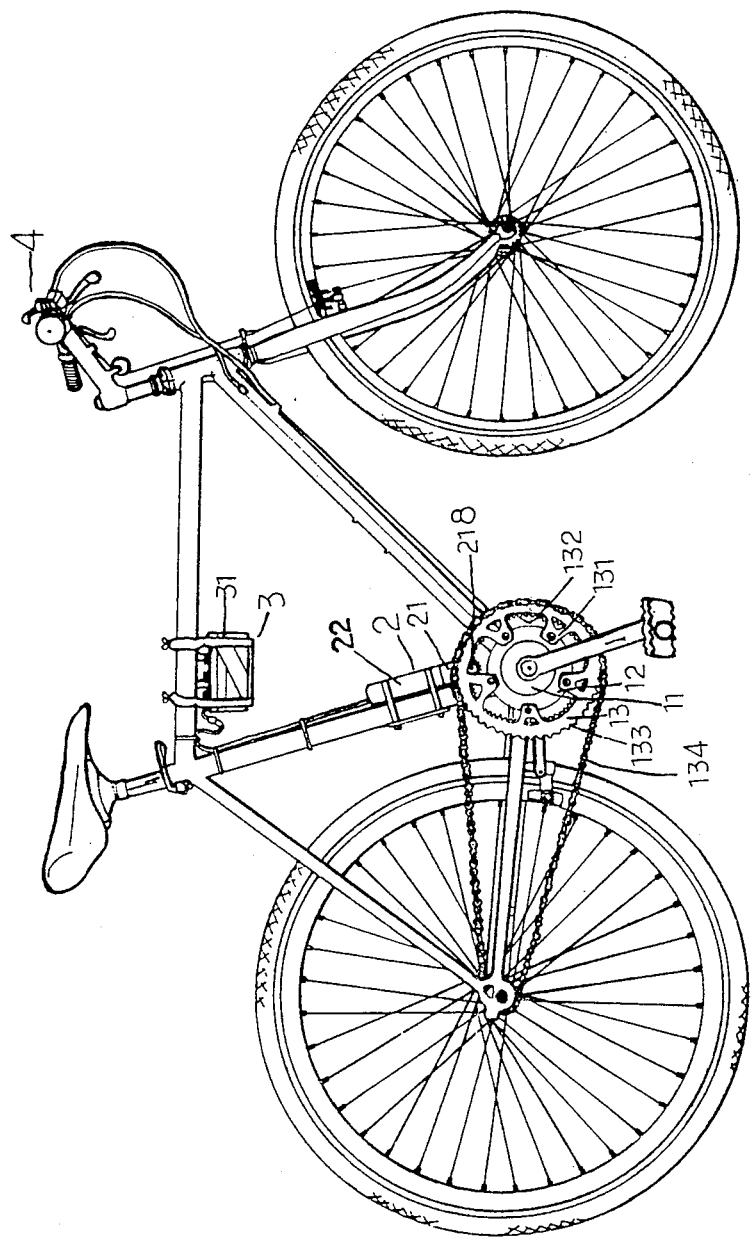
FIG. 1 is an elevation view of the electric bicycle in accordance with the present invention.

Referring now to FIG. 1, there is shown power drive mechanism 2 for electrically actuating the electric bicycle and is used for driving sprocket wheel 13 which is connected to a rear wheel of the bicycle to rotatably actuate the rear wheel of the bicycle. The electric bicycle may be driven through the electrical actuation power drive mechanism, or may be manually actuated by a user.

Figure 2:
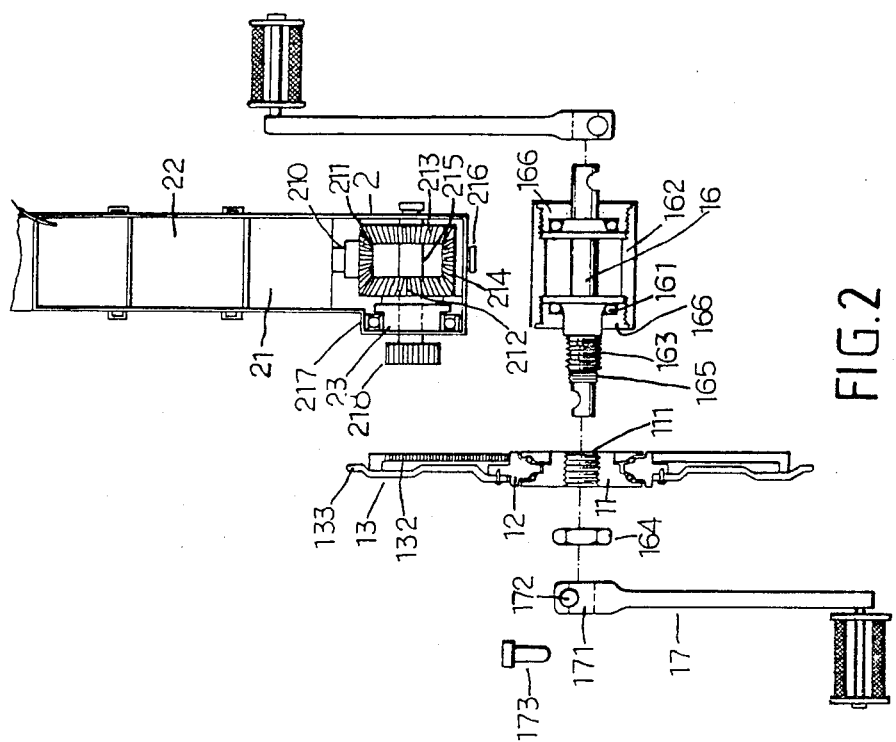
FIG. 2 is an exploded elevational view partially cutaway of the pedal driving mechanism in combination with the electrical power drive system in accordance with the present invention.

Power drive mechanism 2 for electrically actuating the electrical bicycle includes motor 22 coupled to a reduction gear set 21, as depicted in FIG. 2. Reduction grear set 21 is well-known in the prior art for reducing the rotative displacement of motor 22. Reduction gear set 21 is coupled to main bevel gear 211, as is clearly seen in FIG. 2 through motor shaft 210. Main bevel gear 211 matingly engages direction changing bevel gear 212 and first balance bevel gear 213 on opposing sides thereof. Direction changing bevel gear 212 similarly matingly engages main bevel gear 211 and second balance bevel gear 214 on opposing sides, as is clearly seen in FIG. 2.

The revolution speed of motor 22 is reduced by the reduction gear set 21 coupled with the connecting head 210 which is secured to the main bevel gear 211 in combination with the direction changing bevel gear 212 and the balance bevel gears 213 and 214. Central shaft 15 passes through direction changing bevel gear 212 and first balance bevel gear 213 and is fixedly secured thereto for rotation as a function of the rotation of the gears 212 and 213.

Transmission gear 218 is fixedly secured on one end of shaft 215 and is rotatably actuated by the rotation of shaft 215. In this manner, sprocket wheel 13 is rotatably displaced by transmission gear 218 engaging with inner circumferential teeth 132 of sprocket wheel 13.

Figure 3:
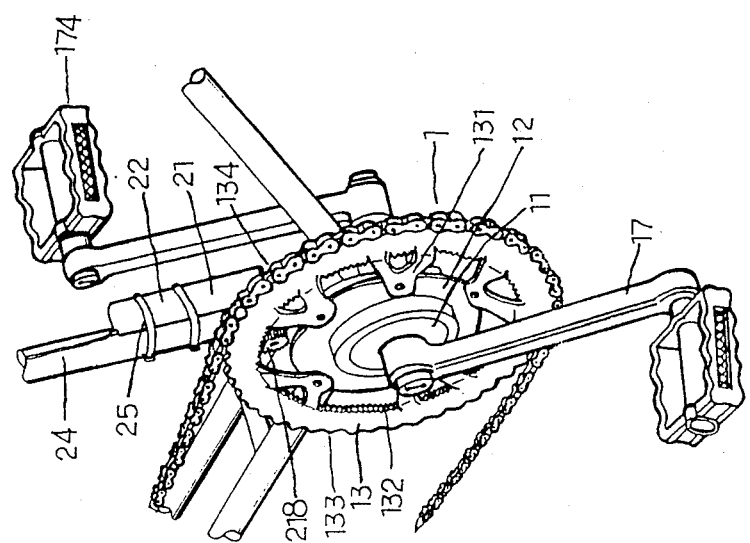
FIG. 3 is a perspective view of the pedal driving system.

Motor 22, reduction gear set 21, connecting head 210, and bevel gears 211, 212, 213, 214, as well as shaft member 215, are positionally located in a tubular case which is fixed on a seat tube, clearly shown in FIG. 3.

Figure 6:
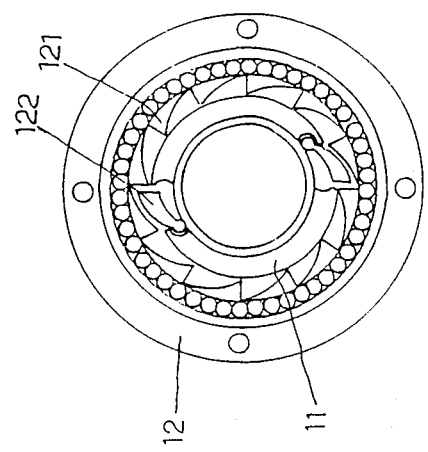
FIG. 6 is a cross-sectional view of the clutch in combination with a sprocket wheel in accordance with the present invention concept.
Figure 5:
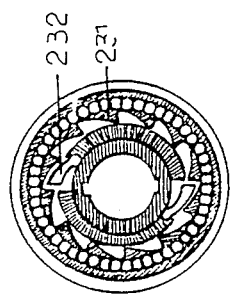
FIG. 5 is a elevational cross-sectional view of the clutch mechanism shown in FIG. 4.
Figure 4:
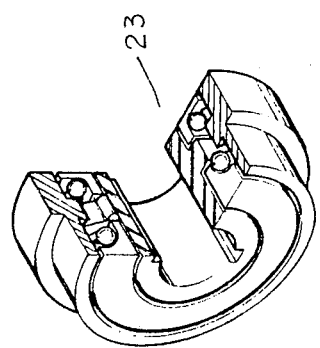
FIG. 4 is a perspective cross-sectional view of a clutch mechanism of the subject invention concept.

The overall pedal drive system includes sprocket wheel 13, clutch 23, and a uni-directional or one-way outer ring 12 and a uni-directional one-way inner ring 11, as well as a pair of crank arms 17 and pedals 174. The uni-directional outer ring 12 is provided with a plurality of tooth members 121 formed on an inner surface and is fixed with the sprocket wheel 13. The inner ring 11 has a pair of clutch tooth members 122 at an outer edge, as shown in FIG. 6. Inner ring 11 includes a female threaded section at its central opening for engaging with male threads on a central shaft 16. The pair of crank arms 17 are fixedly secured on the shaft 16 through pins 173 inserted within pin holes 172 and pedals 174 are mounted on the end bar of the crank arms 17.

Clutch member 23 is mounted on shaft 215 adjacent bevel gear 212, as is seen in FIG. 2. Clutch 23 includes one-way gears 231 formed on the inner circumference of the outer ring and a pair of one-way clutch teeth 232 on the outer circumference of the inner ring. Ball bearings 217 are mounted around the outer circumference of the clutch member 23.

Figure 7:
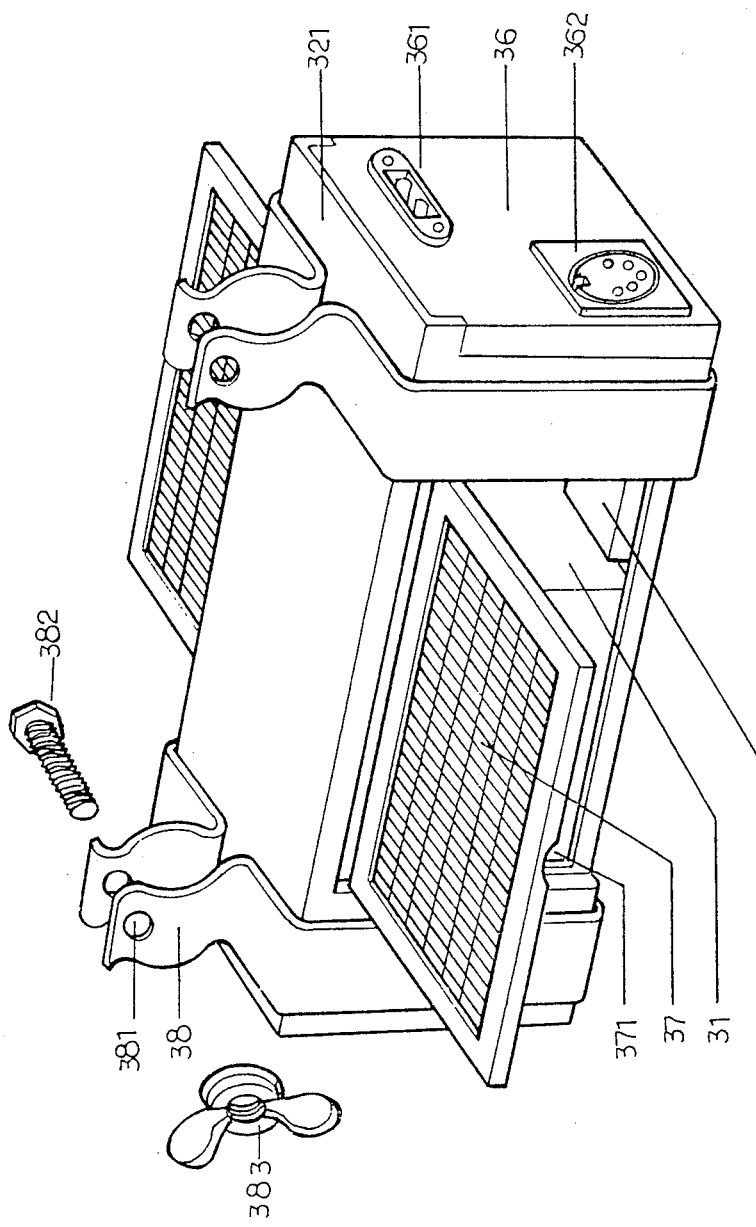
FIG. 7 is a perspective view of the battery case of the electric bicycle.
Figure 8:
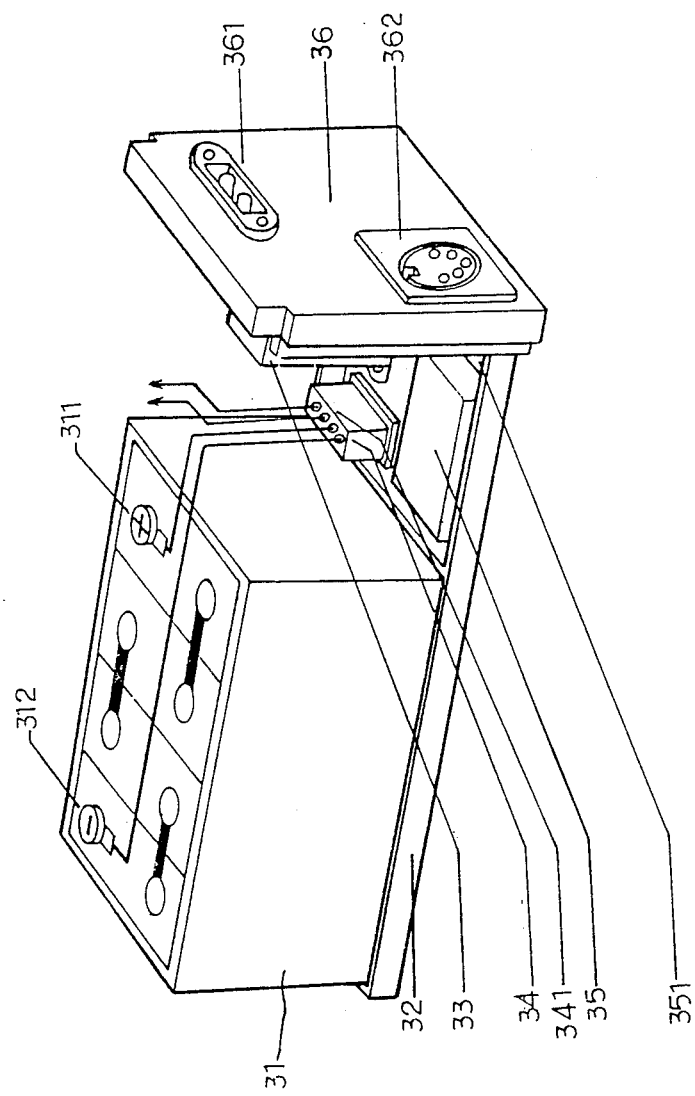
FIG. 8 is a perspective view of the internal portions of a battery case.

Battery case 3 is coupled to the cross-bar of the electric bicycle, as is shown in FIGS. 1 and 3. A pair of solar cell board members 37 are foldably and adjustably mounted on opposing sides of battery case 3 as is shown in FIG. 7. Battery 31 includes a positive terminal 311 and a negative terminal 312, as is shown in FIG. 8. Additionally, as is seen, there is provided input terminal 341 for the solar cells, as well as a speed control device 35 with an AC transformer combined with a rectifier 33 and a circuit board 351 being contained within the battery case 3 on a bottom plate member 32.

Battery case 3 includes front lid 36 which includes an electric plug hole 361 to allow for AC charging of the battery 31. Additionally, a socket 362 is provided for supplying electricity to motor 22. Conducting wires 24, as is seen in FIG. 1, are coupled between the battery 31, the motor 22, and hand speed controller 4. Battery case 3 is mounted on the cross bar by means of clamps 38 secured by the bolts 382 passing through the holes 381 of the clamps 38 and the nuts 383 for tightening clamps 38 together, as is seen in FIG. 7. In this manner, when the electric bicycle is not in use, battery case 3 may be removed from the bicycle frame for charging purposes.

Figure 9:
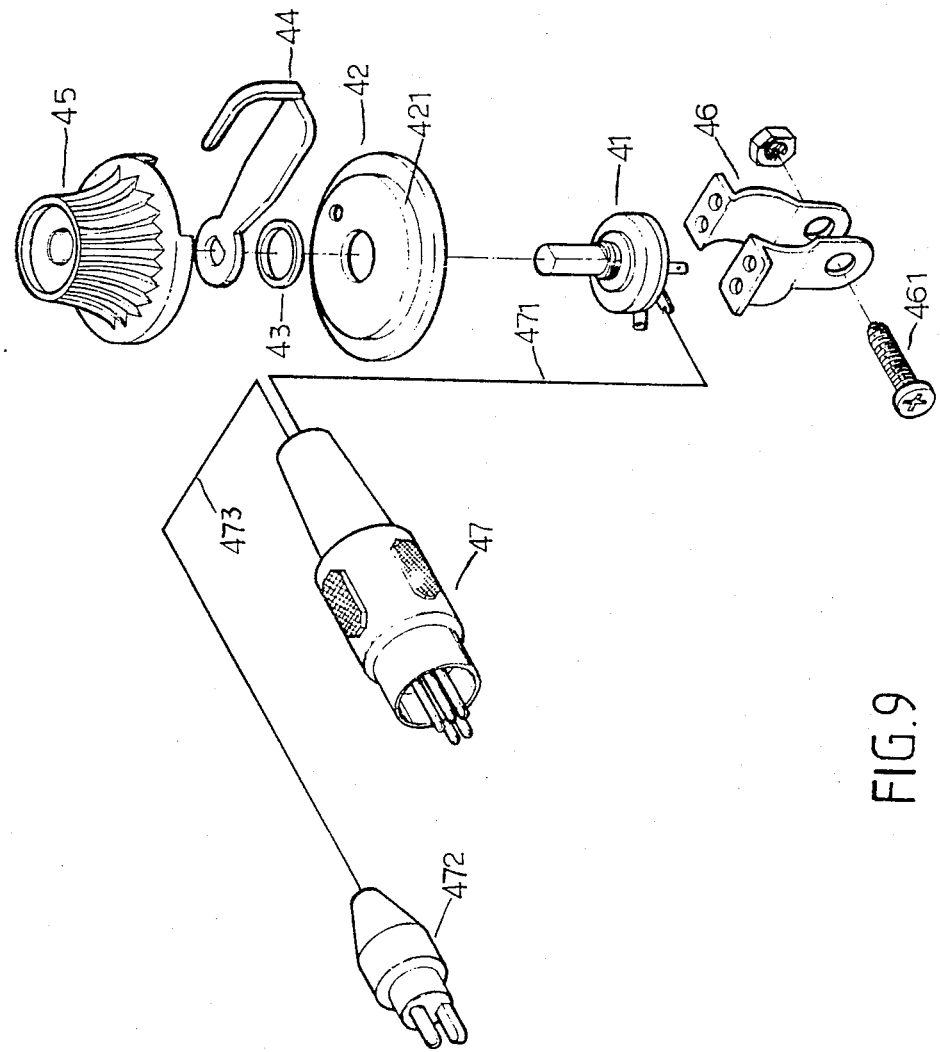
FIG. 9 is an exploded perspective view of a hand speed controller in accordance with the present invention concept.

Hand speed controller 4 shown in FIG. 9 includes variable resistor 41 as well as disc member 42 having a protruding edge 421 and a centrally disposed opening. A fixing ring 43 is provided with a speed control handle 44, as well as a cap member 45 and a pair of fixing plates 46. The variable resistor 41, the disc member 42, the ring 43, the speed control handle 44, and the cap 45 are combined together and secured to the handle bars of the bicycle.

A connecting wire 471 is connected between the speed controller 41 and the plug 47 and an electrically conducting wire 473 is coupled from the plug 472 to the motor 22.

In order to control the speed of the subject electric bicycle, the speed handle 44 in the speed controller 4 may be rotatively displaced. In this manner, the variable resistor 41 is responsively rotated to change its resistance to the current through the coupling or lead wire 471 and the current is varied. The varying current is transmitted to the motor 22 through the lead or coupling wire 471.

Therefore, the rotational speed of the motor 22 may be varied according to current input and the rotational speed of the motor 22 may be varied and reduced by the reduction gears 21 to allow for an increase in the torque and appropriate changes to the turning speed for driving the electric bicycle. The rotation of the reduction gear set 21 is transmitted in order to the connecting head 210, the bevel gears 211 and 212, as well as the shaft 215, and the transmission gear 218 to drive the sprocket wheel 13 and displace the chain mechanism.

In this manner, both the power drive means for electrically actuating the electric bicycle and manual actuation may be provided through the clutch. Additionally, the battery may be charged by the solar cells or by an external AC current. In the event that the battery is charged by solar cells, approximately six hours are necessary for the battery charging and the battery has a life output of approximately two hours. Where the battery is charged by AC current, such charging over six hours will provide a battery life approximating two to three hours. Still further, the rotational speed of the motor is reduced by the reduction gears in order that the torque may be increased and the rotational speed may be adjusted as a function of the speed of the bicycle. The overall weight of the combined power driving system approximates 2.5–3.0 kilograms thereby minimally increasing the weight of a standard bicycle.

What is claimed is:

1. An electric bicycle comprising:
   a sprocket wheel defining an inner ring and an outer ring, said inner ring having a plurality of teeth members extending therefrom;
   power drive means for electrically actuating said electric bicycle, said power drive means including a motor rotatively coupled to a set of reduction gear members, said reduction gear members being coupled to a main bevel gear, said main bevel gear matingly engaging a direction changing bevel gear matingly engaging a direction changing bevel gear and a first balance bevel gear on opposing sides thereof, said direction changing bevel gear matingly engaging said main bevel gear and a second balance bevel gear on opposing sides thereof;
   a clutch mounted on a shaft member passing centrally through said direction changing bevel gear and said first balance bevel gear, said clutch including a plurality of ball bearings rotatively mounted in an outer raceway of said clutch;
   a transmission gear fixedly secured to said shaft member for engaging said teeth members of said sprocket wheel inner ring;
   means for electrically powering said electric bicycle, said electrical power means including a battery and a solar cell, said solar cell and said battery being electrically coupled each to the other;
   means for controlling the speed of said electric bicycle, said speed controlling means including a rotatably actuated variable resistor electrically coupled to said means for electrically powering said electric bicycle, said rotatably actuated variable resistor being secured within a speed changing handle, said variable resistor being actuated by rotation of said speed changing handle for varying electrical current to said motor whereby rotational speed of said motor may be varied.

2. The electric bicycle as recited in Claim 1 where said power drive means includes:
   an AC transformer; and,
   a rectifier electrically coupled to said AC transformer for rectifying AC current output from said AC transformer, said rectified AC current being input to said battery for electrically charging said battery.

* * * * *